(12) United States Patent
Chehlarov et al.

(10) Patent No.: US 12,487,134 B2
(45) Date of Patent: Dec. 2, 2025

(54) SYSTEM AND METHOD FOR IMPROVING TEMPERATURE DETECTORS USING EXPANSION/CONTRACTION DEVICES

(71) Applicant: Sensata Technologies, Inc., Attleboro, MA (US)

(72) Inventors: Nikolay S. Chehlarov, Sofia (BG); Valentin G. Grigorov, Sofia (BG); Lyubomir V. Yanev, Sofia (BG)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 978 days.

(21) Appl. No.: 17/574,042

(22) Filed: Jan. 12, 2022

(65) Prior Publication Data
US 2022/0252465 A1 Aug. 11, 2022

Related U.S. Application Data

(60) Provisional application No. 63/146,108, filed on Feb. 5, 2021.

(51) Int. Cl.
*G01K 13/024* (2021.01)
*G01K 1/08* (2021.01)
*G01K 7/16* (2006.01)

(52) U.S. Cl.
CPC .............. *G01K 13/024* (2021.01); *G01K 1/08* (2013.01); *G01K 7/16* (2013.01); *G01K 2205/04* (2013.01)

(58) Field of Classification Search
CPC .......... G01K 13/024; G01K 1/08; G01K 7/16; G01K 2205/04

USPC ......................................................... 374/208
See application file for complete search history.

(56) References Cited

U.S. PATENT DOCUMENTS

| | | | | |
|---|---|---|---|---|
| 3,832,668 A | * | 8/1974 | Berman | H01C 7/04 338/30 |
| 4,318,073 A | * | 3/1982 | Rossler, Jr. | H01C 7/04 338/30 |
| 8,328,419 B2 | * | 12/2012 | Wienand | G01K 1/12 374/208 |
| 2009/0147826 A1 | * | 6/2009 | Suzuki | G01K 1/08 374/208 |

(Continued)

FOREIGN PATENT DOCUMENTS

| | | | |
|---|---|---|---|
| DE | 102008010206 B4 * | 12/2011 | ............... G01K 1/10 |
| DE | 112015004970 T5 | 7/2017 | |
| GB | 2311900 A * | 10/1997 | ............... G01K 7/22 |

(Continued)

OTHER PUBLICATIONS

Translation of WO2015189109A1.*

(Continued)

*Primary Examiner* — Mirellys Jagan
(74) *Attorney, Agent, or Firm* — Mark H. Whittenberger; Holland & Knight LLP

(57) ABSTRACT

Embodiments of the present disclosure are directed towards various sensing devices. Embodiments may include an external housing and at least one conductor located included within and extending through an opening of the external housing. Embodiments may further include a spring clip included within the external housing and connected to the at least one conductor and a sensing element included within the external housing and connected to the spring clip.

22 Claims, 4 Drawing Sheets

(56) References Cited

U.S. PATENT DOCUMENTS

2012/0110997 A1   5/2012   Bachmann et al.

FOREIGN PATENT DOCUMENTS

WO   2015189109 A1   6/2015
WO   2018060435 A1   9/2017

OTHER PUBLICATIONS

Translation of WO2018060435A1.*
Translation of DE112015004970B4.*
European Search Report and Search Opinion issued in related Application Serial No. 22155287.0 on Jul. 7, 2022.
Office Action cited in related European Application Serial No. 22155287.0 dated Jul. 24, 2024.

* cited by examiner

SYSTEM AND METHOD FOR IMPROVING TEMPERATURE DETECTORS USING EXPANSION/CONTRACTION DEVICES

CROSS-REFERENCE TO RELATED APPLICATIONS

The subject application claims the benefit of U.S. Provisional Application having Ser. No. 63/146,108, filed 5 Feb. 2021. The entire content of which is herein incorporated by reference.

TECHNICAL FIELD

The subject technology relates to temperature sensors and, more particularly to high-temperature sensors, e.g. an exhaust gas temperature sensor. The subject technology further relates to a method for the production of a temperature sensor.

BACKGROUND

Typically, high temperature sensors consist of an outer sheeting which is exposed to the medium to be measured. More specifically, this is the case with exhaust gas temperature sensors where the outer sheet is in contact with the exhaust gas while the internal temperature sensing element is in contact with an internal medium conducting and transferring the heat-flux from the outside to the inside. The internal temperature sensing element could be a positive temperature coefficient (PTC) thermistor or negative temperature coefficient (NTC) thermistor.

High temperature sensors are affected by very high heating and cooling gradients. The gradients lead to excessive compressive and tensile stresses between several materials of the internal components, connections and leads. The stresses could lead to damage of the internal components and conductors carrying the output signal representing the temperature sensed by the internal temperature sensing element.

U.S. Pat. No. 6,639,505 B2 discloses a temperature sensor wherein the distance between a thermistor element and a metal enclosure is not larger than 0.3 mm and the thermistor element and metal enclosure are in contact with each other via an insulating member. The insulating member may be a crystallized glass or a ceramic material. The insulating member eliminates undesired gaps among the thermistor element and metal enclosure.

U.S. Pat. No. 6,829,820 B2 discloses a method of manufacturing a temperature sensor. A thermistor element is inserted into a bottomed metal tube while filling an inside of the metal tube with a filler material, preferably of silicone oil, to reduce a sliding resistance between the thermistor element and the metal tube as an integral temperature sensing structure which is then mounted in a housing. The metal tube is heated after insertion of the thermistor element there in so as to volatize an oil component of the silicone oil. The method reduces the defects due to bending of the electrode wires of the thermistor during placement of the thermistor in the metal tube.

In the temperature sensors described above stresses on the conductors caused by changes in temperature and vibrations between the measurement resistor and the supply-line cable lead to wear on the conductors. In U.S. Pat. No. 8,328,419 B2, a solution to this problem is disclosed. Heat-decoupling wires are arranged between the measurement resistor and strands of the supply-line cable. The heat decoupling wires are stuck as spiral springs on the strands of the mineral insulated supply line cable and connect elastically the measurement resistor to the supply-line cable.

These approaches, and others, may utilize an expansion contraction compensating mechanism in order to improve survival on thermal-cycling conditions, however, other important considerations are not accounted for such as vibration.

SUMMARY OF THE DISCLOSURE

As will be discussed in greater detail below, embodiments of the present disclosure include various sensing devices and associated methods. Embodiments may include an external housing and at least one conductor located included within and extending through an opening of the external housing. Embodiments may further include a spring clip included within the external housing and connected to the at least one conductor and a sensing element included within the external housing and connected to the spring clip.

One or more of the following features may be included. The spring clip may have an asymmetric shape, a front bend portion, and/or a rear bend portion. The sensing device may include a first insulating material located within the external housing surrounding the sensing element. The sensing device may further include a second insulating material partially located within the external housing surrounding the at least one conductor. The sensing device may also include a housing tube surrounding the second insulating material. The at least one conductor and the spring clip may be connected using one or more of welding, soldering, or crimping. The spring clip and the sensing element may be connected using one or more of welding, soldering, or crimping. The spring clip and the at least one conductor may be a single part. The spring clip and the at least one conductor may be constructed of metal or wire of a particular cross-sectional shape. The cross-sectional shape of the spring clip may be selected from the group consisting of circle, ellipse, square, rectangle, hexagon, or tube. The sensing element may be configured to detect exhaust gas temperature or other gas properties. The spring clip may be configured to absorb one or more of expansion and contraction deformation. The spring clip may be located at least partially within an air gap located within the external housing. The sensing device may further include a stopping feature configured to prevent movement of the first insulating material or the second insulating material. The stopping feature may include a rolling design associated with the external housing. The stopping feature may include an inverted cone design associated with the external housing. The stopping feature may also include a dimpled design associated with the external housing. The stopping feature may be configured to prevent rotation of the first insulating material or the second insulating material. The sensing device may include a length of an embedded section of the spring clip in the first insulating material and/or a length between the spring clip and a surface of the first insulating material.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

This summary is provided to introduce a selection of concepts that are further described below in the detailed description. This summary is not intended to identify essential features of the claimed subject matter, nor is it intended to be used as an aid in limiting the scope of the claimed subject matter.

BRIEF DESCRIPTION OF THE DRAWINGS

Embodiments of the present disclosure are described with reference to the following figures.

Like reference symbols in the various drawings may indicate like elements.

DETAILED DESCRIPTION

Embodiments included herein provide numerous advantages to existing approaches. These include, but are not limited to, the increased survival and time to failure of an exhaust gas temperature sensor. This may be achieved by adding a spring clip as a separate component in line with the internal components of the RTD. In operation, the spring clip may function to absorb the expansion and contraction deformations during heating and cooling cycles in the application.

Embodiments may achieve the spring effect with a separately added component rather than forming conductors from the body of the sensor as taught by existing approaches. Some embodiments may also allow for dedicated material selection, finer tolerances, surface treatments and multiple production technologies to be used, none of which are available in current approaches. Embodiments included herein may be configured to account for vibration factors using an improved design.

The discussion below is directed to certain implementations. It is to be understood that the discussion below is only for the purpose of enabling a person with ordinary skill in the art to make and use any subject matter defined now or later by the patent "claims" found in any issued patent herein.

It is specifically intended that the claimed combinations of features not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered a same object or step.

Figure 1:
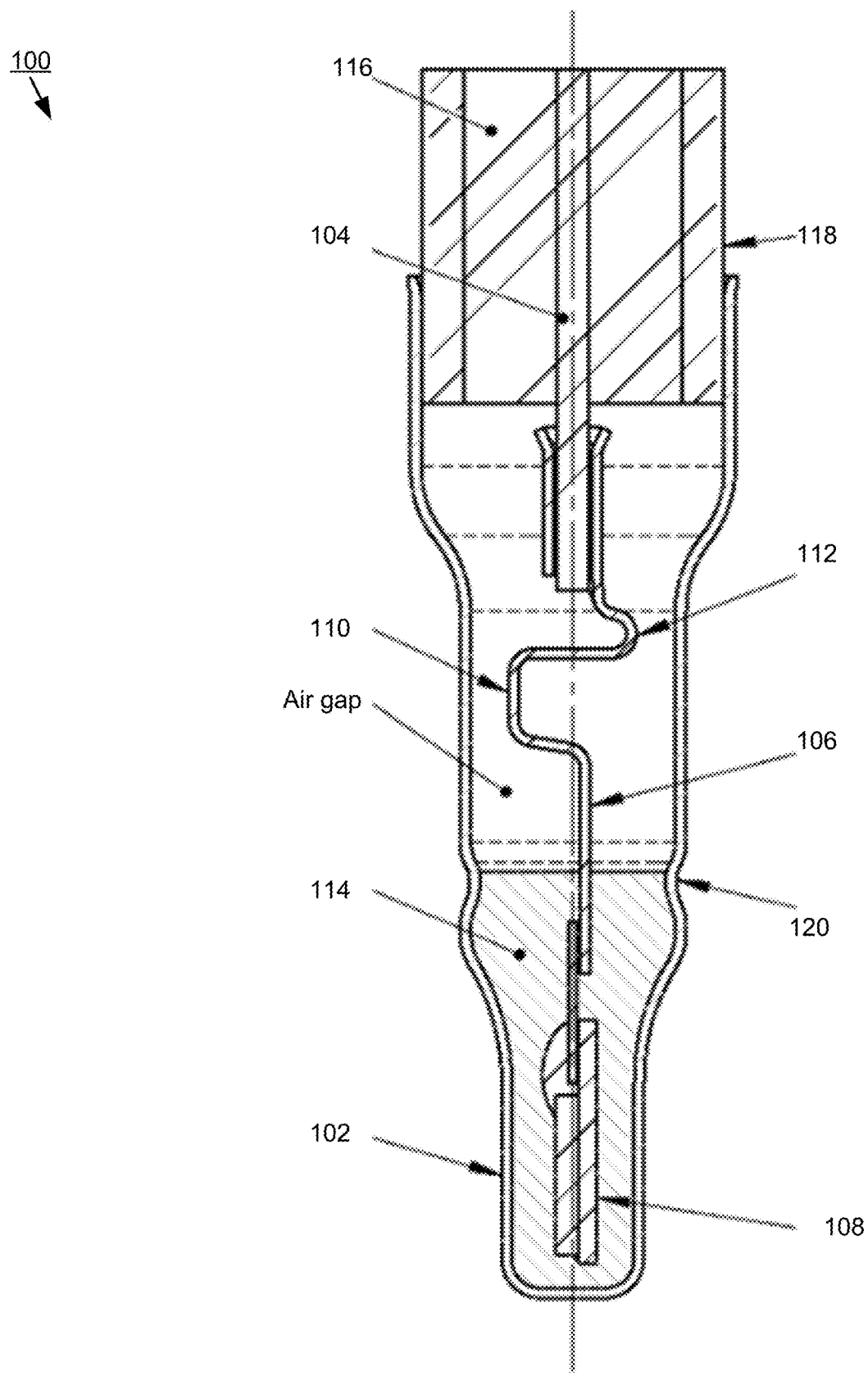
FIG. 1 illustrates a schematic sectional view of a high temperature sensor consistent with embodiments of the present disclosure.

Referring now to FIG. 1, a sensing device 100 consistent with embodiments of the present disclosure is provided. Sensing device 100 may include external housing 102 and at least one conductor 104 located included within and extending through an opening of the external housing. Sensing device 100 may further include spring clip 106 included within external housing 102 and connected to at least one conductor 104. Sensing element 108 may be configured to detect exhaust gas temperature and/or other gas properties and may be included within external housing 102 and connected to spring clip 106.

In operation, temperature changes in the environment create strain and stresses in the device. These stresses, in existing systems, may cause failures of the sensor, dominantly in the sensor internals. One way to reduce these stresses is to reduce the axial stiffness of the internals by lowering their axial stiffness. One practical way to achieve this is by designing a spring (expansion-contraction compensation section) feature on the internals such as spring clip 106. Low axial spring stiffness may be preferred to lower the stresses on the internals.

In some embodiments, spring clip 106 may have any suitable shape, including, but not limited to, the example asymmetric shape shown in FIG. 1. In this particular embodiment, spring clip 106 may also include front bend portion 110 and rear bend portion 112.

In some embodiments, sensing device 100 may further include a first insulating material 114 located within external housing 102 surrounding sensing element 108. Additionally and/or alternatively, second insulating material 116 may be partially located within external housing 102 at least partially surrounding at least one conductor 104. Housing tube 118 may be configured to surround second insulating material 116.

In typical situations, the coefficient of thermal expansion ("CTE") of external housing 102 may be significantly higher than the CTE of first insulating material 114 located therein. In operation, when the sensor is heated, a gap between external housing 102 and first insulating material 114 may try to open. Depending on the contact between external housing 102 and first insulating material 114, it may be possible for a crack to propagate through the insulating material. It is preferred that a gap on the material interface opens, as uncontrolled crack propagation in the insulating material could be avoided. Such mechanical decoupling is described in U.S. Pat. No. 10,345,156B2, which is herein incorporated by reference in its entirety. If such a mechanical decoupling is used, the spring stiffness should be adequate to support first insulating material 114.

In typical situations, the coefficient of thermal expansion ("CTE") of the clip 106 may be significantly higher than the CTE of first insulating material 114. In operation, when the sensor is heated, the clip portion embedded in the first insulating material 114 expands more than the first insulating material 114. This expansion causes two effects (1) longitudinal compression in the embedded section of the clip and (2) radial compression on the embedded section of the clip. The simultaneous action of both effects is unfavorable, especially during rapid cooling. The temperature of the clip near the surface of the first insulating material is lagging the temperature of the clip deeper in the first insulating material. At the start of a cooling cycle, (1) the temperature of the clip near the surface of the first insulating material is higher, causing higher friction forces than the friction forces deeper in the embedded clip; (2) due to the high average temperature of the clip, axial compression in the embedded section of the clip is created; (3) the embedded section of the clip is mechanically restrained by the connection to the chip and by the high friction forces near the surface of the first insulating material—this section is statically indeterminate and high stresses are created in the embedded section of the clip, the connection to the chip and the chip leads. These stresses are typically not affected by the spring stiffness. One possible way to minimize the stresses in the embedded section of the clip is to shorten the length of the embedded section of the clip measured from the surface of the first insulating material and the connection between the clip and the chip leads. The distance between the chip and the free end of the embedded section of the clip should be high in order to minimize the stiffness of the structural system formed by (1) chip leads, (2) connection between the chip leads and the clip, (3) the free end of the embedded section of the clip, (4) the part of the first insulating material between the chip and the clip and (5) the chip body.

In some embodiments, at least one conductor 104 and spring clip 106 may be connected using one or more of welding, soldering, or crimping. Additionally and/or alternatively, spring clip 106 and sensing element 108 may be connected using similar approaches. In some particular embodiments, spring clip 106 and at least one conductor 104 may be a single part as opposed to multiple parts connected together. However, it should be noted that the implementation of the spring as separate clip component has several benefits in achieving better cost/performance balance.

In some embodiments, spring clip 106 and at least one conductor 104 may be constructed of any suitable material, including, but not limited to, steel, wire of a particular cross-sectional shape, etc. For example, the cross-sectional shape may include one or more of the following: circle, ellipse, square, rectangle, hexagon, tube, etc.

In some embodiments, during external housing 102 insertion over sensing element 108 and spring clip 106, having a low spring stiffness may have additional practical benefits. External housing 102 may be guided over housing tube 118, creating lateral displacement of the internals 106 and 108. With a low spring stiffness the induced stresses during the assembly process will be lower.

As discussed above, spring clip 106 and at least one conductor 104 may be implemented as one part. Accordingly, spring clip 106 and/or at least one conductor 104 may be manufactured from stamped and bent steel. Spring clip 106 and/or at least one conductor 104 may be manufactured from drawn wire with different cross section as discussed above, however, other spring forming techniques are also possible.

In operation, spring clip 106 may be configured to absorb one or more of expansion and contraction deformation. In some embodiments, and as shown in FIG. 1, spring clip 106 may be located at least partially within an air gap located within external housing 102 that may allow for deformation. This air gap may divide the insulating material in two parts. Low axial stiffness is preferred to keep the forces low during thermal cycling. RTD sensors are usually exposed to vibrations. Lateral stiffness of the spring should be high to minimize accelerations acting on it and resulting fatigue damage. Axial and lateral stiffness are coupled. Contradictions arise regarding the stiffness of the spring. Low stiffness may be preferred to keep the stresses from thermal cycling low. On the other hand, high stiffness may be preferred to prevent vibration failures.

In some embodiments, partial decoupling of the axial and lateral spring stiffness may be achieved by using a non-symmetric spring clip. For example, sensing device 100 includes a double bend spring that includes front bend 110 and rear bend 112 as shown in FIG. 1. The ratio of the length of both bends of the double bend spring may be optimized so the total fatigue damage from vibrations and temperature cycling may be minimized. In a typical fatigue scenario, the optimal ratio of front bend length to the sum of front bend length plus rear bend length was found to be approximately 0.75. In some embodiments, the non-symmetric spring design included herein may also allow for low axial stiffness to be achieved in a small housing space. This improves the reverse compatibility and fit-form-function neutrality of an RTD within the application.

Figure 2:
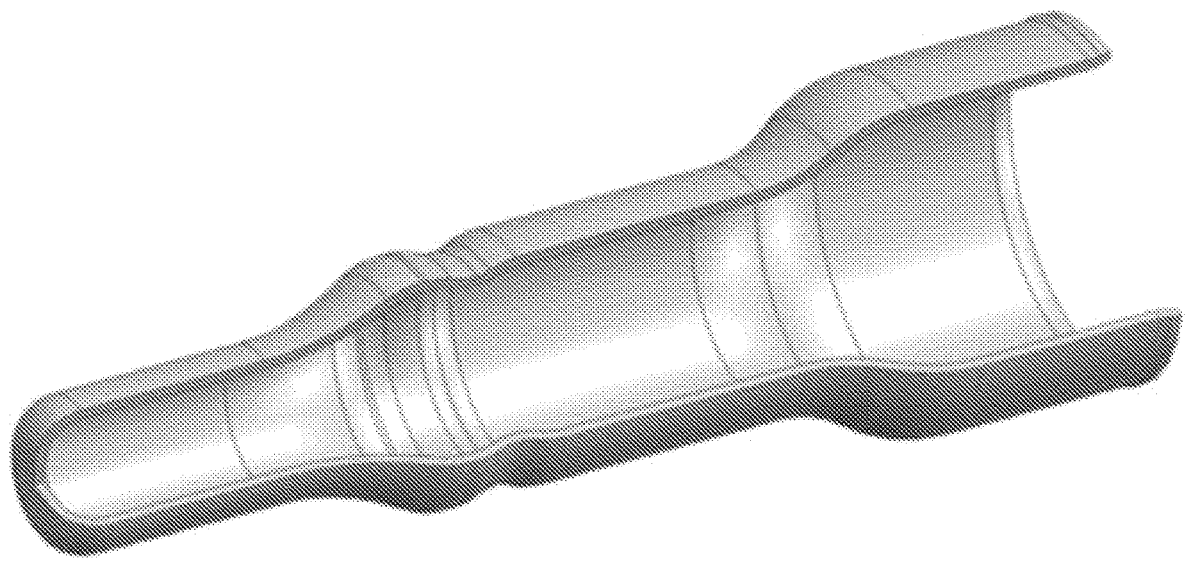
FIG. 2 illustrates a housing with rolling features associated with a high temperature sensor consistent with embodiments of the present disclosure.
Figure 3:
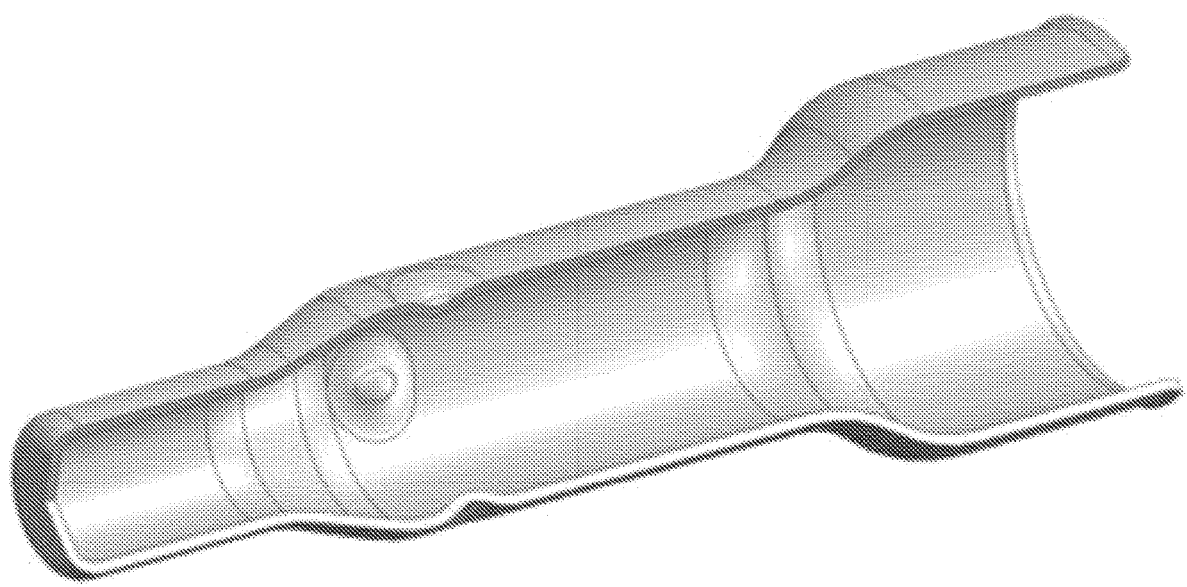
FIG. 3 illustrates a housing with dimpled features associated with a high temperature sensor consistent with embodiments of the present disclosure.
Figure 4:
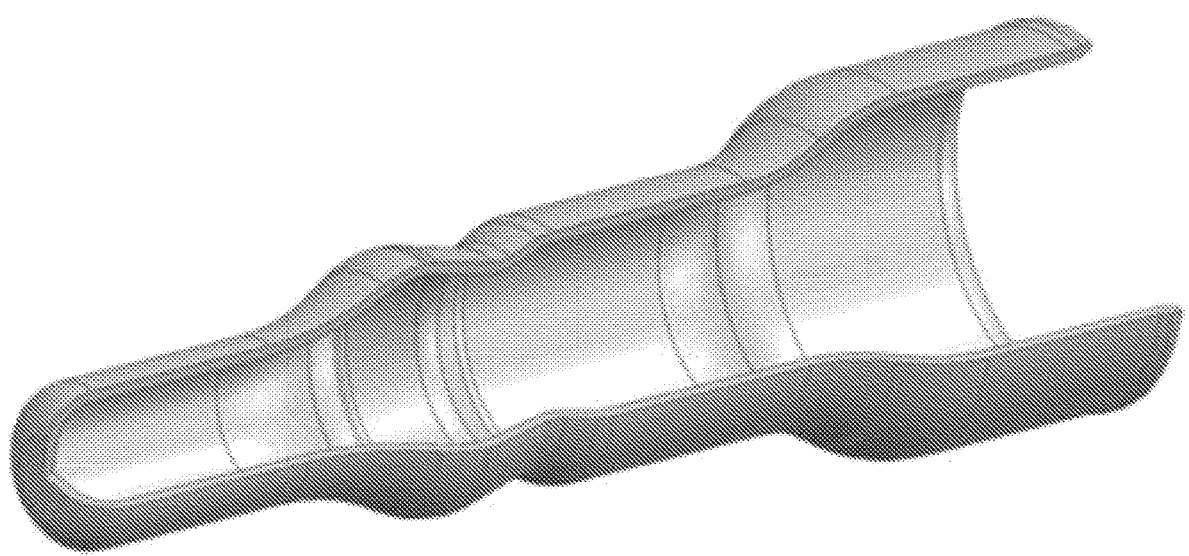
FIG. 4 illustrates a housing with an inverted cone feature associated with a high temperature sensor consistent with embodiments of the present disclosure.

In some embodiments, and referring also to FIGS. 2-4, sensing device 100 may include a stopping feature 120 configured to prevent movement of first insulating material 114 or second insulating material 116. FIG. 2 depicts an example embodiment including a stopping feature which is formed via a rolling process on external housing 102. FIG. 3 depicts an example embodiment including a stopping feature including a dimpled design associated with external housing 102. FIG. 4 depicts an example embodiment including a stopping feature including an inverted cone design associated with external housing 102. In operation, these various stopping features may be configured to prevent movement and/or rotation of first insulating material 114 and/or second insulating material 116.

As discussed above, when the temperature increases, a separation between the first insulating material 114 and external housing 102 may occur. As such, with temperature cycling, the separation could increase between first insulating material 114 and external housing 102. In a sensor with an air gap(s), first insulating material 114 and second insulating material 116 from the front and the back part of the sensor could move towards the air gap, housing spring clip 106. This could lead failure of sensing element 108. High axial stiffness of spring clip 106 is preferred to prevent movement of insulating material(s). As discussed above, RTD sensors are usually exposed to vibrations, accordingly lateral stiffness of spring clip 106 may be high to minimize accelerations acting on it and fatigue damage. Axial and lateral stiffness are linearly coupled. Low stiffness is helpful to keep the stresses from thermal cycling low. On the other hand, high stiffness is helpful to prevent insulation material movement and to prevent vibration failures. Too high spring stiffness could create another problem. At high rates of cooling, compression forces are applied to spring clip 106. At such moments spring clip 106 is usually hot may have low yield stress. These compression forces could cause buckling of spring clip 106. It is possible yielding to occur, and tensile forces to appear in spring clip 106 when the sensor is at room temperature. This pre-tensioning is not desirable, as it could force first insulating material 114 to move towards the air gap. If mechanical decoupling between external housing 102 and insulating materials is used, as described in U.S. Pat. No. 10,345,156B2, the problem with separation becomes even more significant.

Accordingly, movement of first insulating material 114 and second insulating material 116 could be limited by applying the stopping feature as shown in FIGS. 2-4 to external housing 102. As such, stopping feature may be configured to prevent the movement of the insulating material. Some examples of such features include rolling (FIG. 2) and/or dimples (FIG. 3) and/or inverted conical housing (FIG. 4) or any combination therein. By applying such features, the axial stiffness of the spring could be lowered, and failures prevented.

In some embodiments, several factors could stop the separation between first insulating material 114, second insulating material 116 and external housing 102. Some of these may include, but are not limited to, oxidation of the housing, defects in the geometry of the housing, bending of the housing and other. These factors are often unintentionally presented, and replication of separation should be made by minimizing their influence.

In operation, one possible way to implement such a design is to create the stopping features on the sensor's housing and then cast insulating material (potting material). In rotary symmetric housings, stopping features may be designed to stop rotation of the insulating material. Accordingly, embodiments included herein may provide an arrangement wherein the insulating material fixation is not a function of the spring, but a function of a stopping feature. Spring stiffness can be lowered, and lifespan of the device may be improved.

Embodiments included herein may provide a significant increase in sensor survival by adding a spring clip component. Accordingly, this added clip component is a novel way of providing an expansion contraction compensation mechanism. The asymmetric shape of the spring clip may improve fatigue life under vibrations and thermal-cycling. Additionally and/or alternatively, material selection, production technology and after-treatment options are choices decoupled from the rest of the RTD due to the spring clip component. This benefit allows for greater design freedom and cost effectiveness by using suitable materials when/where needed. The function of the spring clip may include absorbing the expansion and contraction deformations during heating and cooling cycles in the application.

Embodiments may achieve the spring effect with a separately added component rather than forming conductors from the body of the sensor as detailed in existing approaches. Some embodiments may also allow for dedicated material selection, finer tolerances, surface treatments and multiple production technologies to be used, otherwise not available in prior art.

Embodiments of the present disclosure may find numerous practical applications. The spring may be made as a separate part (clip) which allows for the use of different materials.

As used in any embodiment described herein, the term "circuitry" may comprise, for example, singly or in any combination, hardwired circuitry, programmable circuitry, state machine circuitry, and/or firmware that stores instructions executed by programmable circuitry. It should be understood at the outset that any of the operations and/or operative components described in any embodiment or embodiment herein may be implemented in software, firmware, hardwired circuitry and/or any combination thereof.

The terminology used herein is for the purpose of describing particular embodiments and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Although a few example embodiments have been described in detail above, those skilled in the art will readily appreciate that many modifications are possible in the example embodiments without materially departing from the scope of the present disclosure, described herein. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

Having thus described the disclosure of the present application in detail and by reference to embodiments thereof, it will be apparent that modifications and variations are possible without departing from the scope of the disclosure defined in the appended claims.

What is claimed is:

1. A sensing device comprising:
    an external housing;
    at least one conductor located and included within and extending through an opening of the external housing;
    a spring clip included within the external housing and connected to the at least one conductor; and
    a sensing element included within the external housing and connected to the spring clip;
    wherein a front bend and a rear bend of the spring clip have a different curvature.

2. The sensing device of claim 1, wherein the spring clip has an asymmetric shape.

3. The sensing device of claim 1, wherein the spring clip has a front bend portion.

4. The sensing device of claim 1, wherein the spring clip has a rear bend portion.

5. The sensing device of claim 1, wherein the at least one conductor and the spring clip are connected using one or more of welding, soldering, or crimping.

6. The sensing device of claim 1, wherein the spring clip and the sensing element are connected using one or more of welding, soldering, or crimping.

7. The sensing device of claim 1, wherein the spring clip and the at least one conductor are a single part.

8. The sensing device of claim 1, wherein the spring clip and the at least one conductor are constructed of a metal or wire of a particular cross-sectional shape.

9. The sensing device of claim 1, wherein a cross-sectional shape of the spring clip is selected from the group consisting of circle, ellipse, square, rectangle, hexagon, or tube.

10. The sensing device of claim 1, wherein the sensing element is configured to detect exhaust gas temperature or other gas properties.

11. The sensing device of claim 1, wherein the spring clip is configured to absorb one or more of expansion and contraction deformation.

12. The sensing device of claim 1, wherein the spring clip is located at least partially within an air gap located within the external housing.

13. The sensing device of claim 1, further comprising:
a first insulating material located within the external housing surrounding the sensing element.

14. The sensing device of claim 13, including a length of an embedded section of the spring clip in the first insulating material.

15. The sensing device of claim 13, including a length between the spring clip and a surface of the first insulating material.

16. The sensing device of claim 13, further comprising:
a second insulating material partially located within the external housing surrounding the at least one conductor.

17. The sensing device of claim 16, further comprising:
a housing tube surrounding the second insulating material.

18. The sensing device of claim 16, further comprising:
a stopping feature configured to prevent movement of the first insulating material or the second insulating material.

19. The sensing device of claim 18, wherein the stopping feature includes a rolling design associated with the external housing.

20. The sensing device of claim 18, wherein the stopping feature includes an inverted cone design associated with the external housing.

21. The sensing device of claim 18, wherein the stopping feature includes a dimpled design associated with the external housing.

22. The sensing device of claim 18, wherein the stopping feature prevents rotation of the first insulating material or the second insulating material.

* * * * *